United States Patent [19]

Watanabe et al.

[11] Patent Number: 4,989,165

[45] Date of Patent: Jan. 29, 1991

[54] APPARATUS FOR CALCULATING VEHICLE-WHEEL REVOLUTION VALUES

[75] Inventors: Masao Watanabe; Ken Asami, both of Nagoya, Japan

[73] Assignee: Toyota Jidosha Kabushiki Kaisha, Japan

[21] Appl. No.: 339,252

[22] Filed: Apr. 17, 1989

[30] Foreign Application Priority Data

Apr. 19, 1988 [JP] Japan ................................. 63-96319

[51] Int. Cl.$^5$ ......................... B60T 8/32; G06F 15/20
[52] U.S. Cl. ............................... 364/565; 364/426.02; 303/95
[58] Field of Search ...................... 364/426.02, 426.04, 364/505; 180/197; 303/94, 95, 100, 105

[56] References Cited

U.S. PATENT DOCUMENTS

| | | | |
|---|---|---|---|
| 4,672,547 | 6/1987 | Masaki et al. | 303/97 X |
| 4,718,013 | 1/1988 | Kubo | 364/565 X |
| 4,729,608 | 3/1988 | Fennel et al. | 303/106 |
| 4,799,178 | 1/1989 | Spadafora et al. | 364/565 |
| 4,811,232 | 3/1989 | Hoashi | 364/426.02 |
| 4,836,619 | 6/1989 | Muto | 303/109 |

FOREIGN PATENT DOCUMENTS 60-22548  2/1985  Japan .
60-35649  2/1985  Japan .
63-90771  4/1988  Japan .

Primary Examiner—Thomas G. Black
Attorney, Agent, or Firm—Oliff & Berridge

[57] ABSTRACT

An apparatus for calculating vehicle-wheel revolution estimated values detects parameters such as the number of vehicle-wheel revolutions and vehicle-wheel revolution speeds, detects differences between the previous estimated values and the detected parameters or other parameters such as vehicle-wheel revolution speeds and accelerations calculated from the detected parameters, stores the differences at a predetermined rate, determines variations, and updates the estimated values based on the determined variations. Since the variations are determined so that the increase rate of the variations decreases as the accumulated values of the differences increase, lag time is minimized and at the same time noise is eliminated, thus precisely estimating the revolution values of the vehicle wheels. Antiskid control, traction control, and other controls can be effectively executed by using the estimated values even when the vehicle wheels move vertically on rough road surfaces or even when the vehicle wheels are eccentric. Consequently, the braking distance can be reduced, and the braking effects and the durability of control units are enhanced.

13 Claims, 10 Drawing Sheets

FIG. 8A  LONG NOISE PERIOD SMALL AMPLITUDE

FIG. 8B  LONG NOISE PERIOD LARGE AMPLITUDE

FIG. 8C  SHORT NOISE PERIOD SMALL AMPLITUDE

FIG. 8D  SHORT NOISE PERIOD LARGE AMPLITUDE

APPARATUS FOR CALCULATING VEHICLE-WHEEL REVOLUTION VALUES

BACKGROUND OF THE INVENTION

This invention relates to an apparatus for calculating vehicle-wheel revolution values for detecting parameters such as the number of vehicle-wheel revolutions and the speed of vehicle wheels, calculating parameters of vehicle-wheel speed and acceleration from the detected parameters, and obtaining estimated values of the vehicle-wheel revolution values from these parameters.

The related-art includes an apparatus which obtains vehicle-wheel revolution values such as the number of vehicle-wheel revolutions, vehicle-wheel revolution speed and acceleration, and which obtains vehicle-wheel speed responsive to vehicle speed, has a device that removes noise from the signals detected by sensors. The noise includes not only electric noise but also noise caused by the movement of the vehicle wheels.

Vehicles are provided with a vertically movable suspension so that vehicle wheels W can absorb vibrations resulting from a rough road surface. Vehicles are also provided with a caster angle $\theta$ to move forward smoothly and to obtain antidive and antilift control. The vehicle wheels W move relative to the vehicle based on the suspension structure and the caster angle $\theta$. When the vehicle wheels W vertically displace by a distance $\Delta H$ relative to the vehicle, they also longitudinally displace by a distance $\Delta L$. As a result, even when the vehicle runs at a constant speed, the revolution speeds of the vehicle wheels W change due to the longitudinal displacement distance $\Delta L$ of the vehicle wheels W, when the vehicle wheels W vertically move on a rough road surface. Accelerations G calculated based on the vehicle-wheel revolution speeds also change remarkably. When the vehicle wheels are eccentric, the vehicle wheels rotate unevenly, and noise generates on the vehicle-wheel speed and acceleration values calculated responsive to the revolution of the vehicle wheels.

The related-art apparatus for calculating vehicle-wheel revolution values removes the noise using a moving-average type filter, a weighted-average type filter, or a low-pass filter. For example, when the vehicle-wheel accelerations are obtained using the weighted-average type filter, averages of instantaneous vehicle-wheel accelerations A1, A2...An detected at a sampling time $\Delta T$ are obtained as follows:

$$Dn = \sum_{i=1}^{n} Ai/n \qquad (1)$$

When noise is removed from the detected discrete values of vehicle-wheel accelerations An using the low-pass filter, the calculations are repeated using an accumulated value Bn as an intermediate buffer according to formula (2), thus updating estimated accelerations Dn.

$$Bn = K0 \cdot Bn-1 + (An - Dn-1)$$

$$Dn = Dn-1 + K2 \cdot Bn \qquad (2)$$

The calculated vehicle-wheel acceleration estimates are used for an antiskid control unit that prevents the vehicle wheels from skidding during braking (see Japanese Published Unexamined Patent Application No. S60-22548, titled "Antiskid Control Unit"), and for a traction control unit that prevents the vehicle wheels from slipping during quick starting or quick accelerating.

However, the related-art apparatus for calculating the vehicle-wheel revolutions takes averages of detected values or uses a low-pass filter with a time constant, resulting in the following problems:

(1) The parameters detected responsive to vehicle-wheel revolutions or the parameters to be calculated such as vehicle-wheel accelerations include accelerations caused by braking and detected for braking controls, and accelerations as noise due to vertical movement of the vehicle wheels on the rough road surface. If the detection signals are simply averaged using formula (1), the accelerations to be detected are averaged without being distinguished from the noise. As a result, the accelerations cannot be precisely detected. When sampling period is lengthened and the number n of acceleration data for taking averages is increased, too much time is consumed for detecting changes in accelerations, delaying the start of the control operations.

(2) When noise is removed using the low-pass filter and the coefficient K2 in formula (2) is reduced, then the amplitude of noise can be reduced, but the control operations are again delayed. In FIGS. 12A–12C, detection signals are shown in broken lines, having zero noise, noise half a base signal value and noise twice the base signal value. As shown in FIGS. 12A, 12B, and 12C, when the value of the coefficient K2 decreases, noise with amplitudes in some range can be removed from the detected signals shown by broken lines in FIGS. 12A, 12B, and 12C. However, the time T until the filtered value shown by solid lines in FIGS. 12A, 12B, and 12C intersects a threshold value Gth lengthens. As shown in the right graph of FIG. 12C, when noise has an amplitude out of the range, the time T lengthens markedly. The threshold value Gth indicates the level at which pressure starts decreasing under antiskid control.

(3) When the vehicle-wheel accelerations obtained by the related-art calculation apparatus having these problems are used for the antiskid control and other controls, the antiskid control unit or the traction control unit cannot respond quickly on rough road surfaces. The effectiveness of the antiskid control unit on rough road surfaces declines, and the braking distance lengthens as compared with that on a smooth road surface with less noise. If the value of the coefficient K2 is determined according to low-level noise, noise cannot be removed sufficiently, and the threshold value Gth should be adjusted to avoid malfunction due to noise. In addition, the control unit cannot respond quickly even on a smooth road surface. If the threshold value Gth is determined according to low-level noise, the antiskid control unit frequently adjusts the braking oil pressure, lengthening the braking distance.

SUMMARY OF THE INVENTION

An object of the invention is, therefore, to quickly calculate vehicle-wheel revolution values and efficiently remove noise from the detected values.

Another object of the invention is to minimize lag time in control operations, at the same time remove the influence of noise on the control operations, estimate the vehicle-wheel revolution values precisely, and employ the values for anti-skid, traction and other control operations.

Figure 1:
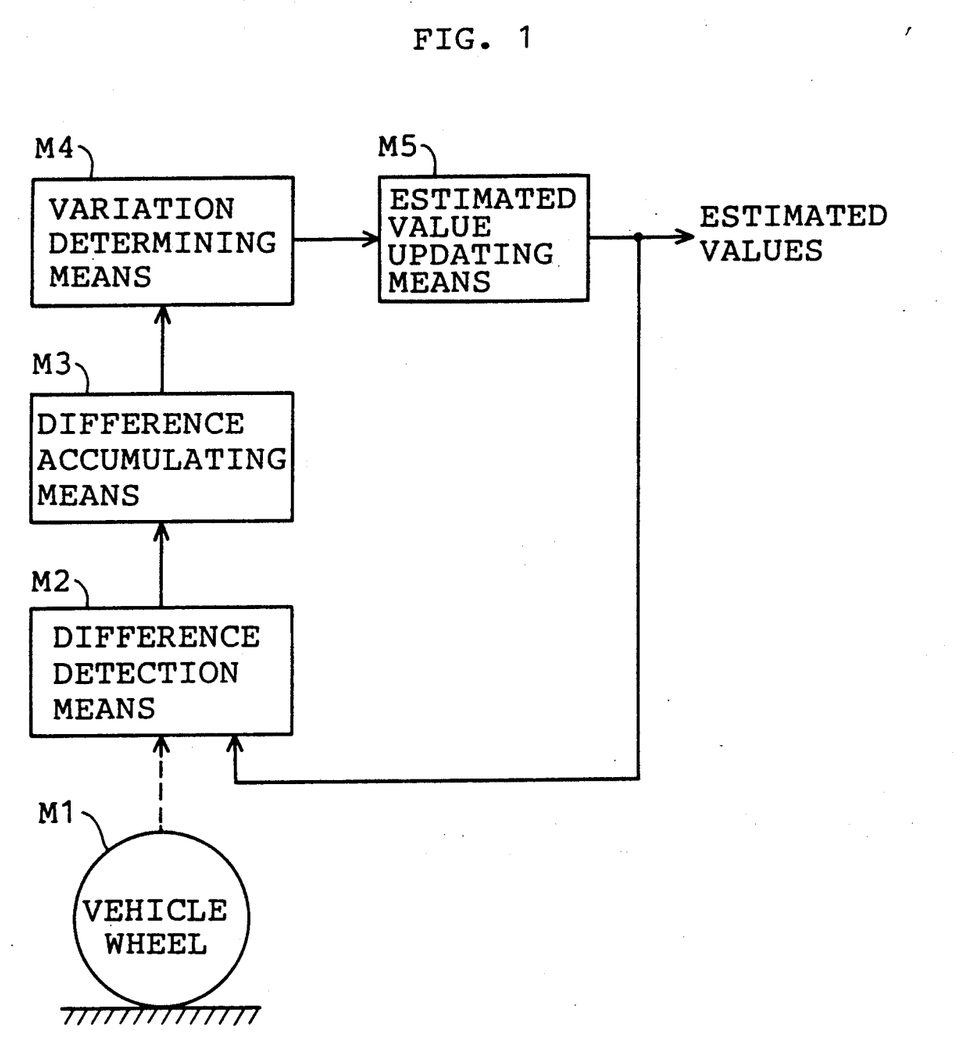
FIG. 1 is a block diagram showing a basic structure of the invention.

These objects are achieved by the present invention as set forth below. As shown in FIG. 1, the invention provides an apparatus for calculating vehicle-wheel revolution estimated values. The apparatus comprises means for detecting a parameter from movement of vehicle wheels M1, means for calculating another parameter from the detected parameter, and means for removing noise from one of the detected parameter and the calculated parameter to obtain the estimated value. The means for removing noise comprises difference detection means M2 for detecting a difference between one of the detected parameter and the calculated parameter, and a previous estimated value, difference accumulating means M3 for accumulating the difference detected by the difference detection means M2 at a predetermined rate, variation determining means M4 for determining a variation value and reducing an increase rate of the variation value when an absolute value of the difference accumulated by the difference accumulating means M3 increases, and estimated-value updating means M5 for updating the estimated value according to the variation value.

The difference detection means M2 can comprise a register for storing the previous estimated value and a subtracter for calculating the difference between the previous value and the detected or calculated parameter, and can comprise an arithmetic logical calculation circuit independent of or together with the difference-accumulating means M3 and the estimated-value updating means M5. The parameters detected or calculated include the revolution angle, the number of revolutions or the acceleration of the vehicle wheels M1.

The difference-accumulating means M3 stores the difference detected by the difference detection means M2 at an experimentally predetermined rate.

The variation determining means M4 can obtain the variation by multiplying the accumulated values with coefficients. The coefficients can be decreased when the accumulated value exceed a predetermined value. The variation can be also obtained by referring to a table where the variation decreases when the absolute value of the accumulated values increases.

The estimated-value updating means M5 can obtain new estimated value by adding the variation to the previous estimated value. A new estimated value can be also obtained by referring to a table plotting the previous estimated value to the variation.

BRIEF DESCRIPTION OF THE DRAWINGS

The invention may be best understood by referring to the following description of the preferred embodiment and to the drawings in which:

FIGS. 12A, 12B and 12C are graphs illustrating some problems of the related art.

DETAILED DESCRIPTION OF THE PREFERRED EMBODIMENT

An embodiment of the present invention will be described referring to the drawings.

An apparatus for calculating vehicle-wheel revolution values of this invention calculates the vehicle-wheel acceleration as a revolution amount using an electronic control unit described later. In the present embodiment, this apparatus is used in an antiskid control system.

Figure 2:
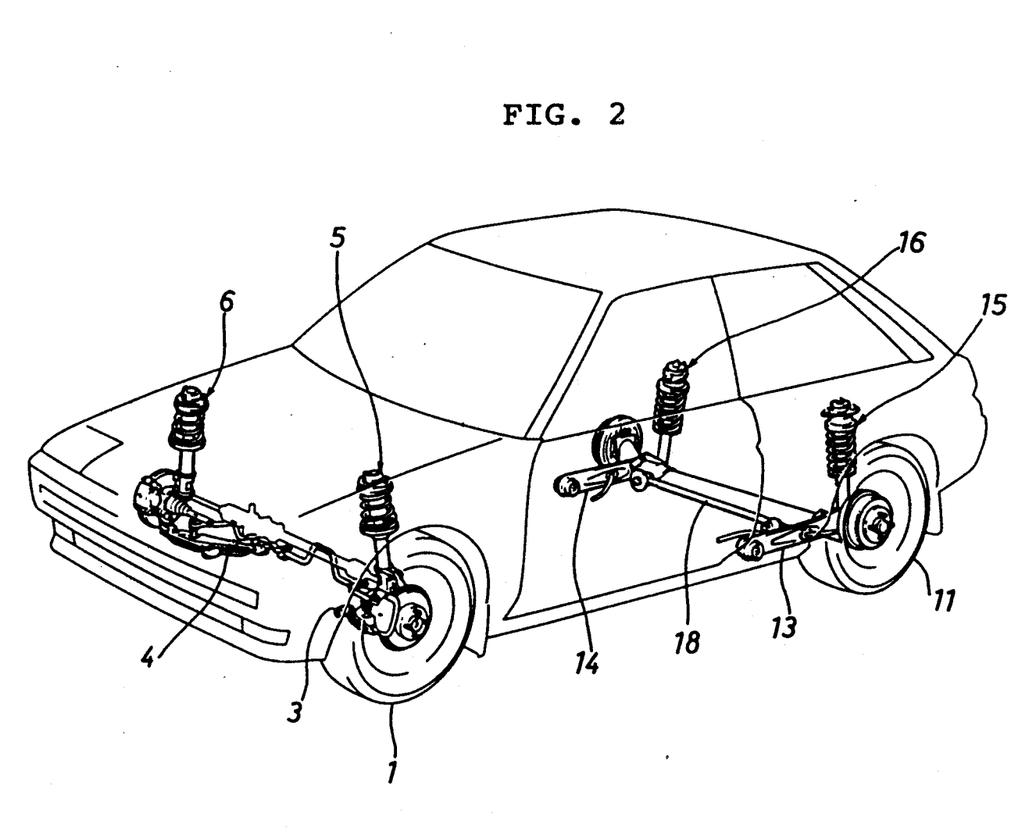
FIG. 2 is a perspective view of a vehicle equipped with the apparatus for calculating vehicle-wheel revolution values for the embodiment.

As shown in FIG. 2, left and right front wheels 1 and 2 are provided with a Mcpherson strut type independent suspension system which comprises lower arms 3, 4 and shock absorbers 5, 6. Left and right rear wheels 11 and 12 are provided with a trailing type suspension system which comprises trailing arms 13, 14, shock absorbers 15, 16, and a trailing twist beam 18. The shock absorbers 5, 6, 15 and 16 are fluid type, filled with compressible gas, and provided with coil springs.

Figure 3:
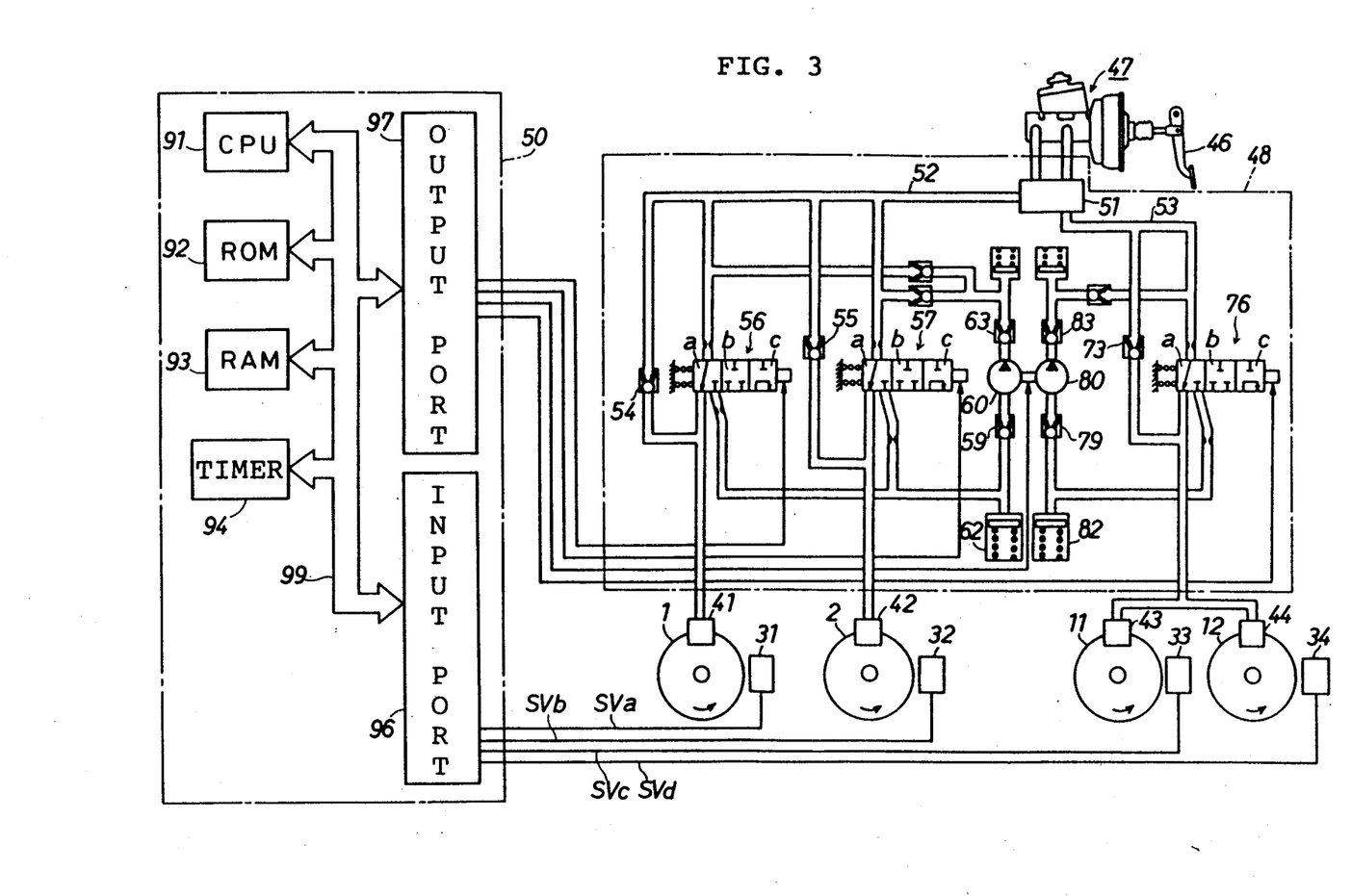
FIG. 3 is a schematic diagram of an antiskid control unit incorporating the apparatus for calculating vehicle-wheel revolution values.

As shown in FIG. 3, an antiskid control system incorporating the calculation apparatus of the present embodiment controls the left and right non-driven front wheels 1 and 2 and the left and right driven rear wheels 11 and 12. These wheels 1, 2, 11 and 12 are provided with vehicle-wheel speed sensors 31, 32, 33, 34, which are of the electromagnetic pickup type or the photoelectric transfer type. These sensors 31, 32, 33 and 34 detect the revolution speed of the respective wheels and transmit detection signals SVa, SVb, SVc and SVd, respectively, to an input port 96.

The left and right front and rear wheels 1, 2, 11 and 12 are slowed or stopped by a hydraulic brake system that comprises wheel cylinders 41, 42, 43, and 44, respectively for the wheels 1, 2, 11 and 12.

The operation of a brake pedal 46 supplies braking oil pressure to the wheel cylinders 41, 42, 43, and 44. When the brake pedal 46 is pressed, a brake master cylinder 47 connected to the brake pedal 46 generates braking oil pressure, and an actuator 48 adjusts the oil pressure to be applied to the wheel cylinders 41, 42, 43, 44, in response to an output signal from an electronic control unit 50.

Subsequently, the structure of the actuator 48 is explained.

As shown in FIG. 3, a proportioning bypass valve 51 in the actuator 48 receives braking oil from the brake master cylinder 47, divides it, and guides it into a braking oil pipe 52 for the front wheels and a braking oil pipe 53 for the rear wheels. The proportioning bypass valve 51 distributes the braking oil pressure properly for front and rear wheels to equalize the braking force of the wheels.

The braking oil pipe 52 for the front wheels separates into two lines for left and right front wheels 1 and 2, respectively. The two lines further branch into four passages equipped with check valves 54, 55 and change valves 56, 57, respectively, and lead to the wheel cylinders 41 and 42 for the left and right front wheels 1 and 2. The change valves 56 and 57 are three-position valves, and have three ports; one input port and two output ports. One of the two output ports is connected to a passage which leads via check valve 59 to an electric pump 60. This passage also leads to a reservoir 62. For the output from the electric pump 60, the pump 60 discharges high-pressure oil via a check valve 63 to the passage upstream the change valves 56 and 57 of the braking oil pipe 52.

On the other hand, the braking oil pipe 53 for the left and right rear wheels 11 and 12 differs from the braking oil pipe 52 in that only one line guides braking oil to the wheel cylinders 43 and 44 for the rear wheels 11 and 12. The braking oil goes via the passage with a check valve 73 and the passage with a change valve 76 to the wheels cylinders 43 and 44. A check valve 79, an electric pump 80, a reservoir 82 and a check valve 83 for the braking oil pipe 53 have the same structure as the check valve 59, the electric pump 60, the reservoir 62 and the check valve 63 for the front braking oil pipe 52.

Change valves 56, 57 and 76 have three-port-connection, electromagnetic valves that can be switched to three control positions: position (a) where an input port connects with one of two output ports; position (b) where the input and output ports are disconnected from each other; and position (c) where both output ports connect with each other. When the change valves 56, 57 and 76 are switched to the position (a), braking oil distributed from the brake master cylinder 47 by the proportioning bypass valve 51 or pressure oil discharged from the electric pumps 60 and 80 goes through the change valves 56, 57 and 76 into the wheel cylinders 41, 42, 43 and 44. As a result, when the brake pedal 46 is pressed, or when the electric pumps 60 and 80 operate, the braking oil pressures in the wheel cylinders 41, 42, 43 and 44 rise. On the other hand, when the change valves 56, 57 and 76 are switched to the position (b) where all the ports are disconnected from each other, the braking oil pressures in the wheel cylinders do not change. However, when the brake pedal 46 is almost or completely released, thus decreasing the braking oil pressure applied by the brake master cylinder 47, the braking oil returns through the check valves 54, 55 and 73 to the brake master cylinder 47. When the change valves 56, 57 and 76 are switched to position (c) where the output ports connect with each other, the braking oil goes from the wheel cylinders 41, 42, 43, 44 to the reservoirs 62 and 82. The braking oil pressures in the wheel cylinders 41, 42, 43, 44 decrease, accordingly. On the other hand, the electric pumps 60 and 80 draw the braking oil out of the reservoirs 62 and 82 and force it back to the brake master cylinder 47.

The electronic control unit 50 connects to, actuates and controls the change valves 56, 57 and 76 and the electric pumps 60 and 80 for the antiskid control described later. The vehicle-wheel speed sensors 31, 32, 33 and 34 are mounted to the left and right front and rear wheels 1, 2, 11, and 12, respectively, and transmit the detection signals SVa, SVb, SVc and SVd to the connected electronic control unit 50 for the antiskid control.

The structure of the electronic control unit 50 and the electric circuit for a braking force control system are now explained using FIG. 3.

The electronic control unit 50 comprises known CPU 91, ROM 92, RAM 93 and a timer 94, and also includes the input port 96 for receiving signals from outside and an output port 97 for transmitting signals to the actuator 48. The input and output ports 96 and 97 are connected by a bus 99 to the CPU 91, the ROM 92, the RAM 93 and the timer 94.

Since the input port 96 connects to the vehicle-wheel speed sensors 31, 32, 33 and 34, the CPU 91 can read vehicle-wheel revolution speeds Vn of the wheels 1, 2, 11 and 12 through the input port 96.

On the other hand, the output port 97 connects to respective solenoid coils of the change valves 56, 57 and 76. When the antiskid control starts, the CPU 91 actuates via the output port 97 the solenoid coils of the change valves 56, 57 and 76 and switches the change valves 56, 57 and 76 to either of the positions (a), (b) and (c). Furthermore, during the antiskid control, the CPU 91 actuates via the output port 97 the electric pumps 60 and 80.

Figure 4:
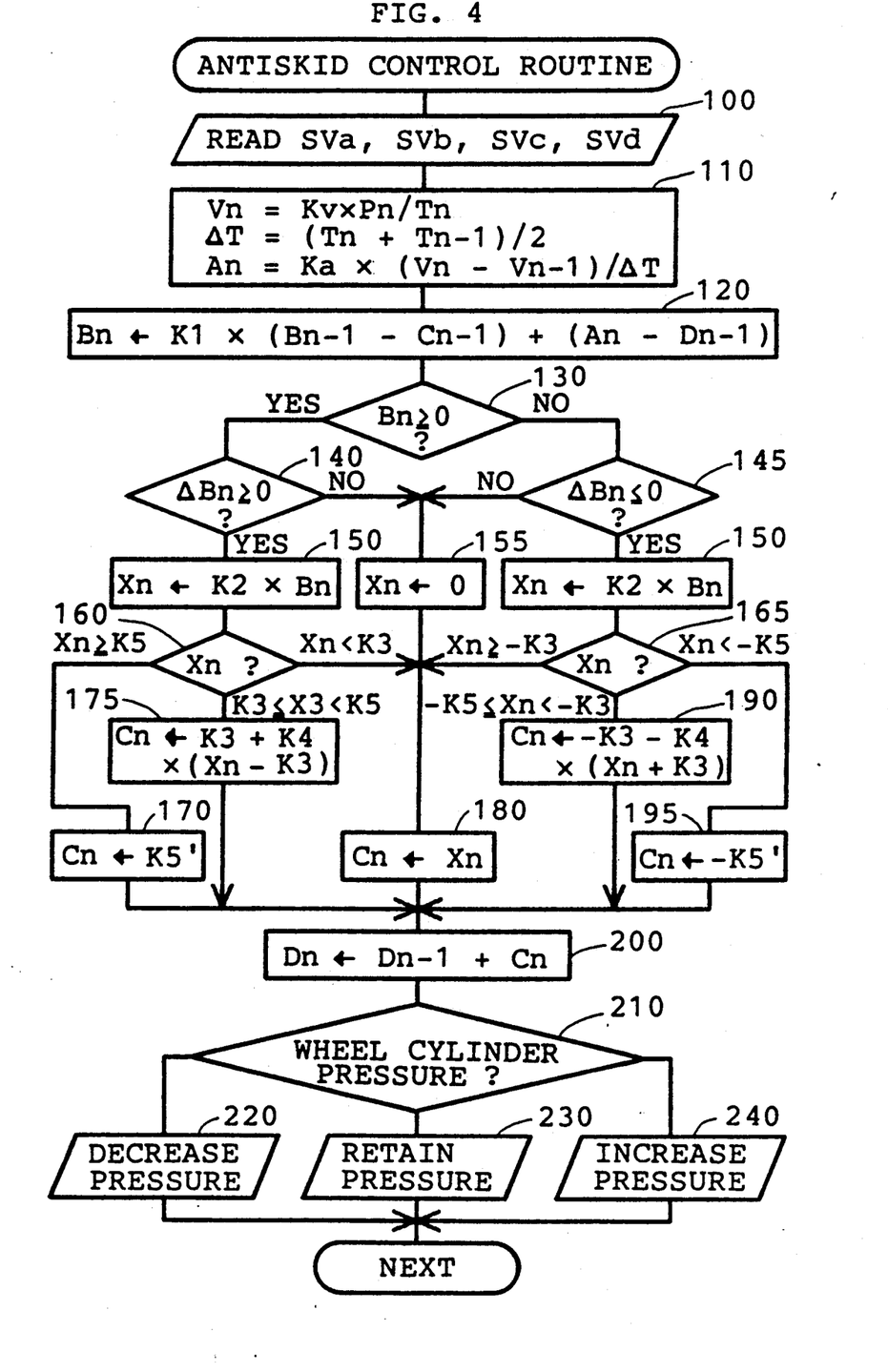
FIG. 4 is a flowchart of an antiskid control routine.

As shown in the flowchart of FIG. 4, in the electronic control unit 50, the antiskid control routine is repeatedly executed when the brake pedal 46 is operated. The electronic control unit 50 detects revolution speeds of the wheels 1, 2, 11 and 12, eliminates noise from the detected speeds, calculates vehicle-wheel accelerations An, detects the slippage of the wheels based on the accelerations An, adjusts braking oil pressure if necessary, and thus controls the braking forces of the wheels.

The antiskid control routine and the processings executed in the calculation apparatus of vehicle-wheel revolution values are now explained using the flowchart in FIG. 4.

When the routine of FIG. 4 starts, step 100 reads the signals SVa, SVb, SVc and SVd via the input port 96 from the vehicle-wheel speed sensors 31, 32, 33, and 34. In the flowchart, a subscript n denotes a sampling frequency. While n represents the present measurement or calculation, n−1 represents the previous measurement or calculation. Based on the detection signals SVa, SVb, SVc and SVd read at step 100, step 110 calculates the vehicle-wheel revolution speeds Vn of the wheels 1, 2, 11 and 12, calculates a unit time $\Delta T$, and calculates the vehicle-wheel accelerations An for the unit time $\Delta T$. The vehicle-wheel revolution speed Vn is calculated using formula (3) as the number of pulse signals Pn transmitted from the vehicle-wheel speed sensors 31, 32, 33, 34 for predetermined time Tn. The unit time $\Delta T$ is the average obtained by dividing the sum of the predetermined time Tn and the previous predetermined time Tn−1 by two with formula (4). The vehicle-wheel acceleration An is a instantaneous vehicle-wheel acceleration at time n, obtained as a variation of the vehicle-wheel revolution speed for the unit time $\Delta T$, based on formula (5). In formulas (3), (4) and (5), Kv and Ka are coefficients which vary according to the type or the structure of the apparatus.

$$Vn = Kv \cdot Pn/Tn \qquad (3)$$
$$\Delta T = (Tn + Tn-1)/2 \qquad (4)$$
$$An = Ka \cdot (Vn - Vn-1)/\Delta T \qquad (5)$$

After determining the instantaneous vehicle-wheel acceleration An in step 120 and successive steps, a digital-filtering process removes noise from the vehicle-wheel acceleration calculated based on the detection signals SVa, SVb, SVc and SVd. Formulas (6), (7), (8) and (9) represent the digital-filtering process. The digital filter is an improvement of high grade of the low-pass filter.

$$Bn = K1 \cdot (Bn-1 - Cn-1) + (An - Dn-1) \qquad (6)$$

$$Xn = \begin{cases} K2 \cdot Bn & (\Delta Bn \cdot Bn \geqq 0) \\ 0 & (\Delta Bn \cdot Bn < 0) \end{cases} \quad (7)$$

$$\Delta Bn = Bn - Bn - 1$$

$$Cn = \begin{cases} K5' & (K5 \leqq Xn) \\ K3 + K4 \cdot (Xn - K3) & (K3 \leqq Xn < K5) \\ Xn & (-K3 \leqq Xn < K3) \\ -K3 - K4 \cdot (Xn + K3) & (-K5 \leqq Xn < -K3) \\ -K5' & (Xn < -K5) \end{cases} \quad (8)$$

$$\pm K5' = \pm K3 + K4 \cdot (K5 - K3)$$

$$Dn = Dn - 1 + Cn \quad (9)$$

In the above formulas, the initial value of $Bn-1$ and $Cn1$ is zero, and the initial value of $Dn-1$ is the same value as that of the detected value $An$. Formulas (6) through (9) are derived by adding an intermediate formula $Cn = K2 \cdot Bn$ to the formula (2) as explained in the description of the related art. Formulas (6) through (9) use the same coefficient $K2$ as formula (2) does. The coefficients $K0$, $K1$, $K2$ have the relationship shown in the formula: $K0 = K1 \cdot (1 - K2)$. When the absolute value of the accumulated value $Bn$ of acceleration differences equals or exceeds the predetermined value $K3$, $K3$ suppresses the degree of variance in acceleration. A proportional coefficient $K4$ determines the increase rate of the variation $Cn$ when the absolute value of the accumulated value $Bn$ equals or exceeds the predetermined value $K3$. A guarding value $K5$ determines the ceiling value of the variation $Cn$. The value of the coefficients $K1$-$K5$ varies with the cycle of computation and the number of pulses of the vehicle wheel.

The relationship of formulas (2) and (6) with their intermediate formulas is as follows:

$$Bn = K0 \cdot Bn - 1 + (An - Dn - 1) \quad (2)$$

when the formula $K0 = K1(1-K2)$ is inserted in the above formula (2), the following formula is obtained:

$$Bn = K1(1-K2) \cdot Bn - 1 + (An - Dn - 1)$$

$$BN = K1(Bn - 1 - K2 \cdot Bn - 1) + (An - Dn - 1)$$

Since $Cn = K2 \cdot Bn$, the following formula is established:

$$Bn = K1(Bn - 1 - Cn) + (An - Dn - 1) \quad (6)$$

In the above formulas, $Bn-1$ is the previous calculation value and $Bn$ is the present calculation value.

Figure 5:
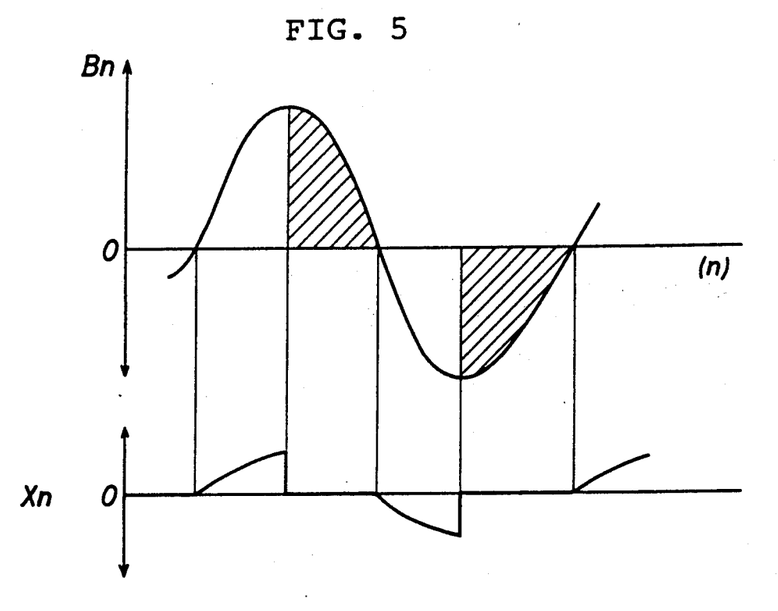
FIG. 5 is a graph showing variances of the variables Xn with time.
Figure 6:
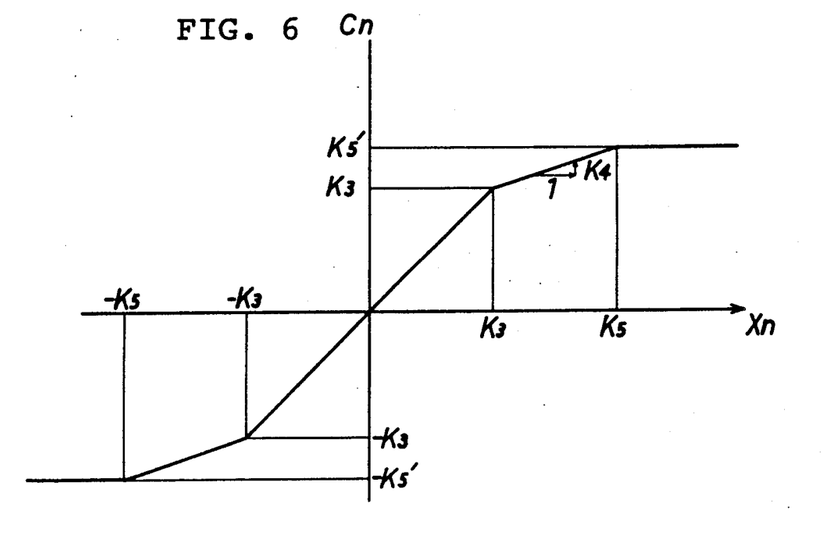
FIG. 6 is a graph showing the relationship between the variables Xn responsive to the accumulated values and the variations Cn.

As shown in formulas (6) through (9), during the digital-filtering process, the differences between the calculated vehicle-wheel acceleration $An$ and a previous estimated acceleration $Dn$ are stored at a predetermined rate. As the absolute value of the accumulated value $Bn$ increases, the increase rate of the variation $Cn$ is reduced. The estimated acceleration $Dn$ is updated using the variation $Cn$. The formula (7) indicates that as shown in FIG. 5, when the absolute value of the accumulated value $Bn$ of acceleration differences decrease monotonically, the variation $Cn$ resets to zero, stopping the filtering process. As a result, the estimated acceleration $Dn$ is not updated, and rippling elements in the vehicle-wheel acceleration $An$ are efficiently minimized. Formula (8) determines the variation $Cn$ by which the estimated acceleration $Dn$ is updated so that the increase rate of the variation $Cn$ decreases, when the absolute value of the variation $Cn$ increases. According to formula (8), a variable $Xn$ reflecting the accumulated value $Bn$ and the variation $Cn$ have the relationship shown in FIG. 6.

In FIG. 4, steps 120 through 200 correspond to the digital-filtering process. Step 120 calculates the accumulated value $Bn$ of the calculated vehicle-wheel acceleration $An$ and the estimated vehicle-wheel acceleration $Dn$, using formula (6). Steps 130, 140 and 145 compare the variation of the accumulated value $Bn$ with zero to determine whether the absolute value of the accumulated value $Bn$ monotonically increases or decreases. Steps 150 and 155 determine the variable $Xn$ using formula (7). Steps 160, 165, 170, 175, 180, 190 and 195 determine the variation $Cn$ according to the variable $Xn$. Step 200 updates the estimated acceleration $Dn$ according to the variation $Cn$, according to the formula (9).

Step 210 determines whether the wheel cylinder pressures should be increased, maintained, or decreased. The braking forces of the wheels 1, 2, 11, and 12 are thus controlled according to the estimated acceleration $Dn$, the vehicle-wheel revolution speed $Vn$ and the vehicle-wheel acceleration $An$. When the brake pedal 46 is pressed too hard, the vehicle-wheel revolution speed $Vn$ becomes lower compared with the vehicle speed, and the vehicle-wheel acceleration $An$ lowers below the standard value. As a result, it is determined that the vehicle wheels are locked, then step 220 decreases the pressures in the wheel cylinders 41, 42, 43 and 44 by switching the change valves 56, 57 and 76 to position (c). On the other hand, when the pressures in the wheel cylinders 41, 42, 43 and 44 are decreased to set the vehicle-wheel revolution speed $Vn$ and the vehicle-wheel acceleration $An$ back to the standard values, step 230 maintains the pressures in the wheel cylinders 41, 42, 43 and 44 by switching the change valves 56, 57 and 76 to position (b). When the vehicle-wheel revolution speed $Vn$ exceeds a pressure-maintaining standard value determined by the vehicle speed, or when the vehicle-wheel acceleration exceeds a standard braking value, it is determined that the pressures in the wheel cylinders 41, 42, 43 and 44 should be raised to increase the braking force, so step 240 increases the pressures in the wheel cylinders 41, 42, 43 and 44 by switching the change valves 56, 57, and 76 to position (a). After decreasing, maintaining, or increasing the pressures, the process goes to "NEXT", finishing one cycle of this control routine.

According to formula (8), the apparatus for calculating vehicle-wheel revolution values changes the increase rate of the variation $Cn$ in response to the amplitude of noise in the vehicle-wheel acceleration $An$ calculated directly from the number of vehicle-wheel revolutions, alters the value of the coefficient $K2$ in formula (6) and thus suppresses the increase of the delay time and efficiently removes the noise. When the value of the coefficient $K2$ changes, the variation $Cn$ is suppressed where the variable $Xn$ is large in formula (8). In formula (7), the coefficient $K2$ is reduced.

Figure 7A:
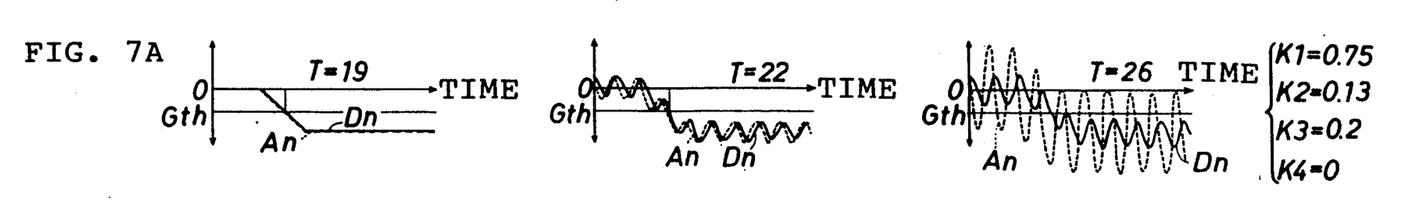
FIGS. 7A, 7B, 7C, 7D and 7E are graphs showing values of estimated accelerations Dn with various coefficients.
Figure 7B:
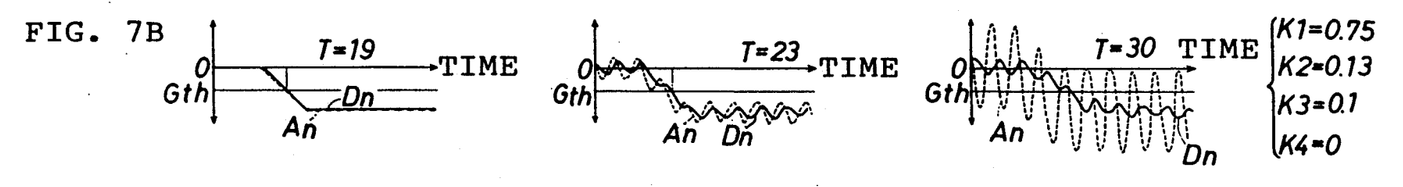
Figure 7C:
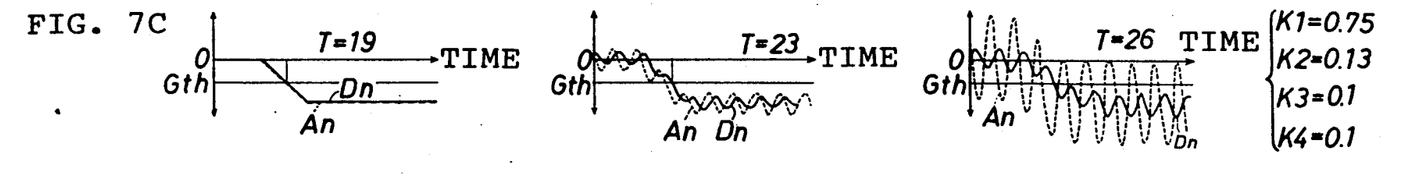
Figure 7D:
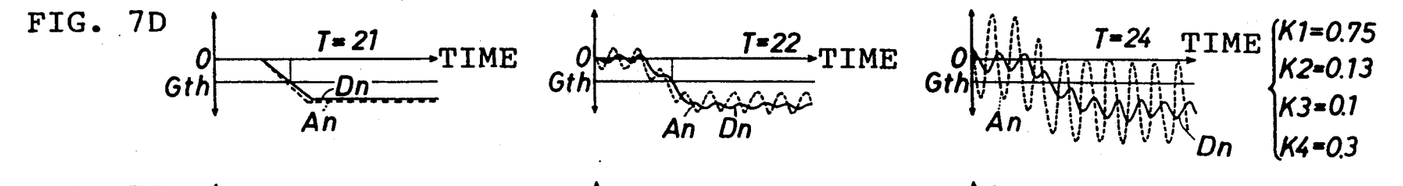
Figure 7E:
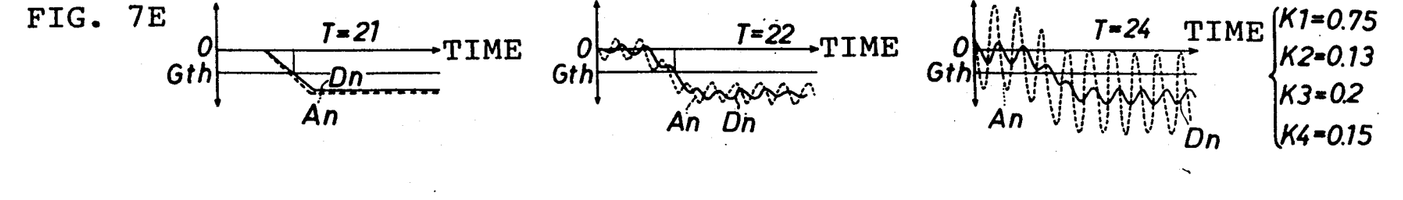
Figure 8A:
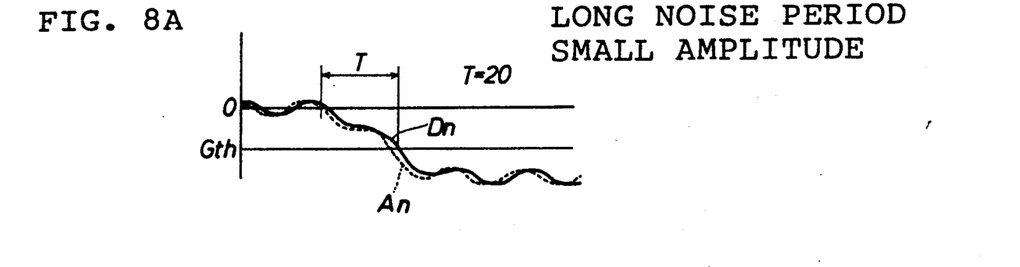
FIGS. 8A, 8B, 8C and 8D are graphs showing the values of vehicle-wheel accelerations An with noise of various amplitudes and periods.
Figure 8B:
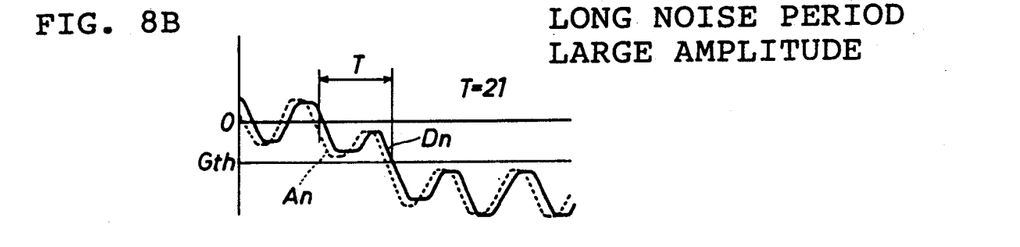
Figure 8C:
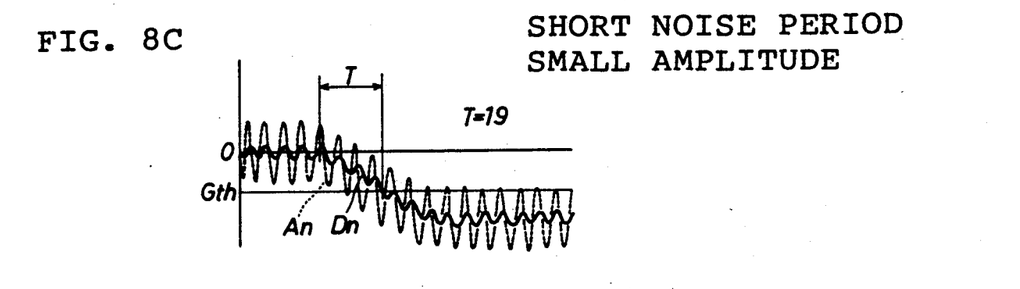
Figure 8D:
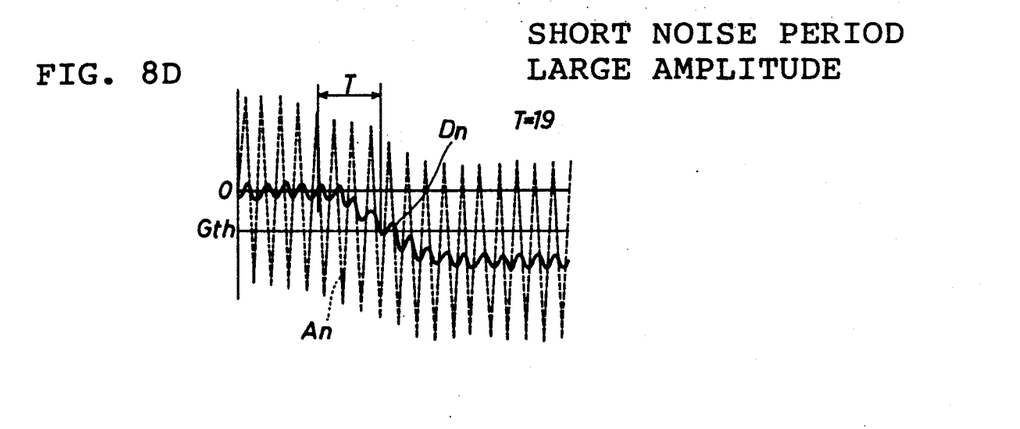

As shown in FIGS. 7A-7E, the estimated vehicle-wheel acceleration $Dn$ is calculated by altering coefficients $K1$, $K2$, $K3$ and $K4$. As shown in FIGS. 7A and 7B, when noise is reduced, lag time T until the estimated vehicle-wheel acceleration Dn is detected to go below the threshold value Gth becomes shorter compared with the related art shown in FIG. 12C, even when the coefficient K4 is zero. Even when the absolute value of the accumulated value Bn of acceleration differences exceeds the predetermined value K3, and the increase rate of the variation Cn is set to zero, the lag time T shortens. Since in the present invention noise is efficiently removed from the calculated values, the lag time T is minimized. As shown in FIGS. 7C-7E, when the coefficient K4 determines the increase rate of the variation Cn exceeding zero, noise is also efficiently removed and the lag time T becomes shorter compared with the related art.

Figure 9A:
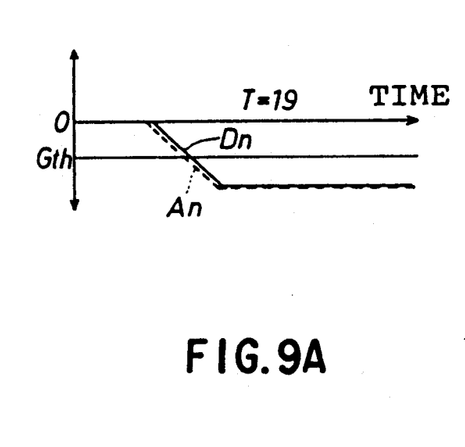
FIGS. 9, 10A, 10B and 11 are graphs showing the antiskid control effects using the apparatus for calculating vehicle-wheel revolution values.
Figure 9B:
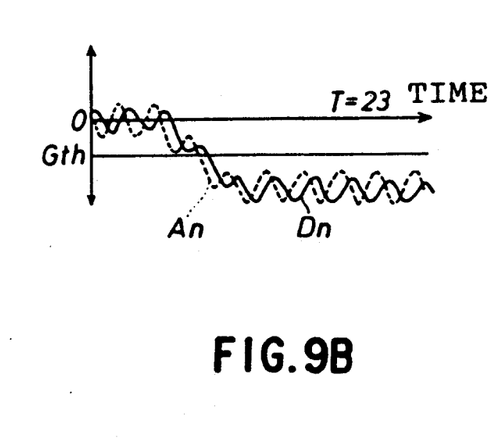
Figure 9C:
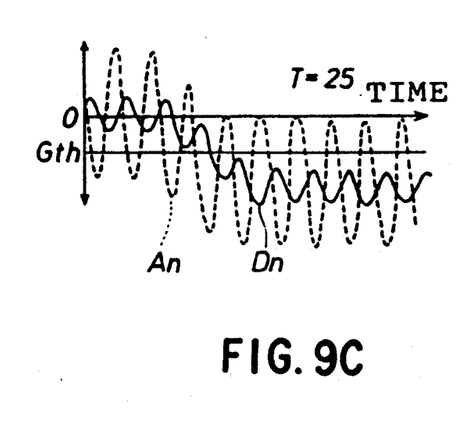

As shown in FIGS. 8A-8D, when K1 is 0.857, K2 is 0.13, K3 is 0.2, and K4 is 0.1, the time until the estimated vehicle-wheel acceleration Dn falls below the threshold value Gth does not change significantly, quick response is assured, and noise is efficiently eliminated, irrespective of the period and the amplitude of the noise. As shown in FIG. 9, when K3 equals 0.1 and K4 equals 0.15. the vehicle-wheel acceleration can be efficiently estimated, even when the wheels 1, 2, 11, and 12 are eccentric.

Figure 10A:
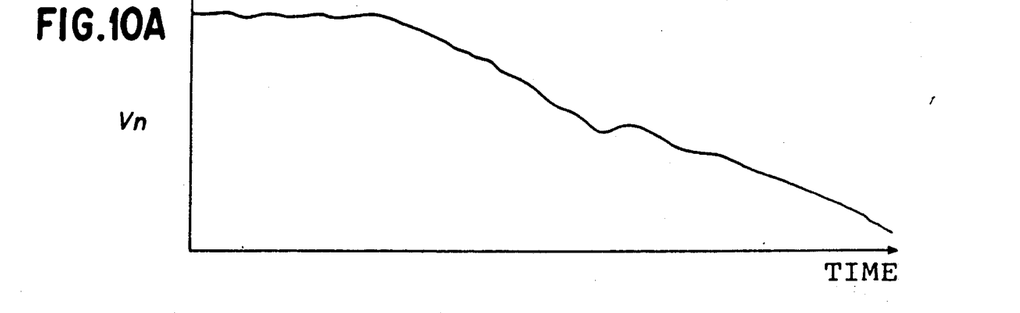
Figure 11A:
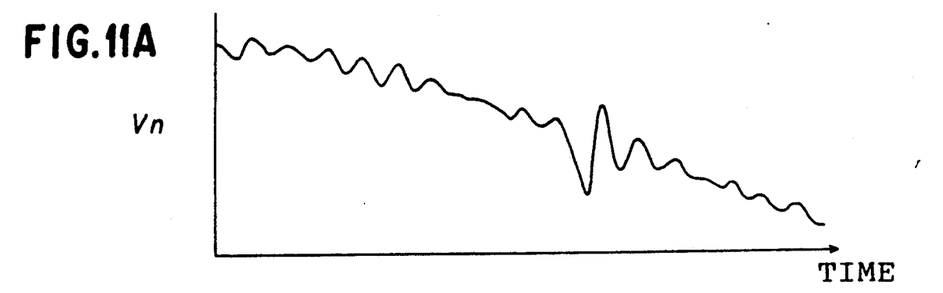
Figure 11B:
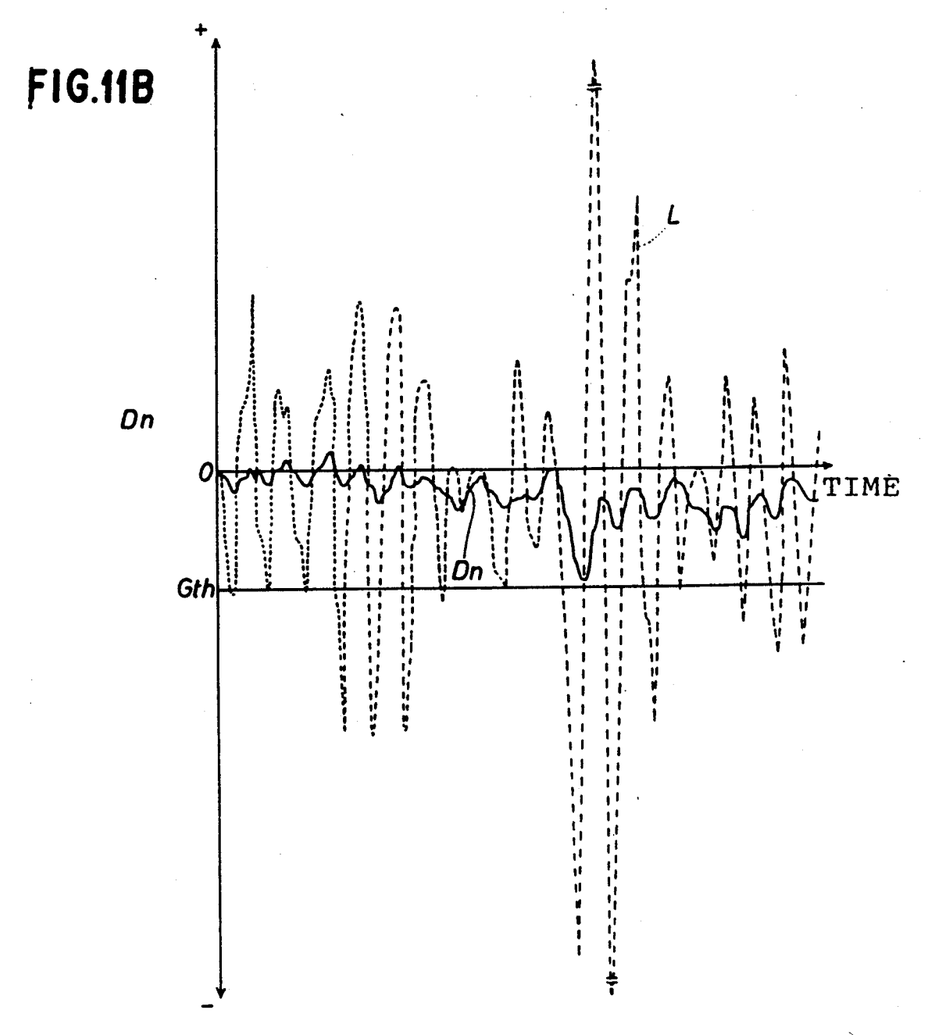

Since the antiskid control unit incorporates the apparatus for calculating vehicle-wheel revolution values of this invention, the antiskid control unit can control the braking forces of the vehicle wheels 1, 2, 11, and 12 using the vehicle-wheel acceleration Dn calculated and estimated precisely and quickly. As shown in FIG. 10A, changes in the vehicle-wheel acceleration Dn caused by the antiskid control against medium braking force applied on a smooth road surface can be distinguished from noise. As shown in FIG. 11, the vehicle-wheel acceleration Dn resulting from the vertical movement of the vehicle wheels on a rough road surface can be removed as noise. As a result, the vehicle-wheel acceleration representing the wheels' braking conditions can be detected more precisely and quickly as compared with the related-art moving average method shown by the broken line L in FIGS. 10A and 11.

Figure 10B:
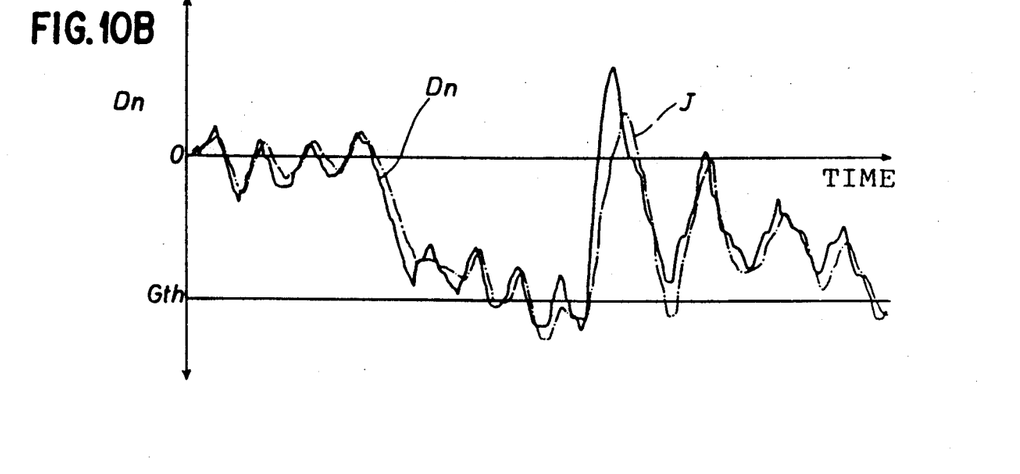

As shown by a dashed line J in FIG. 10B, the related-art acceleration detector has a longer lag time even when the number of data N for the moving average method is increased. As shown by the solid line in FIG. 10B, in the present embodiment, the amplitude of noise automatically changes the number of acceleration data. In the present embodiment, lag time is reduced, and noise is removed. Specifically, as the accumulated value Bn increases, the increase ratio of the variation Cn decreases. When the amplitude of noise increases, the difference between An and Dn as well as the accumulated value Bn of the difference also increase. That means the number of data for averaging is increased by reducing the increase ratio of the variation Cn. On the other hand, when the amplitude of noise decreases, the increase ratio of the variation Cn increases and the number of data decreases.

The antiskid control unit for the present embodiment drives the actuator 48 to properly control the braking forces of the wheels 1, 2, 11, and 12, and obtains a braking distance close to that on a smooth road surface. The braking forces can be precisely controlled, for example, by preventing vehicle height changes caused by nose-diving during braking from influencing accelerations. On the other hand, as a result of removing noise from the detected accelerations, smooth braking-force control is achieved, because the change valves 56, 57 and 76 are not switched very often to decrease the pressures in the wheel cylinders 41, 42, 43, and 44. Since the change valves 56, 57, and 76 need not be operated as often, the durability of the antiskid control unit is thus enhanced. The antiskid control unit executes quicker control by removing noise from the detected accelerations.

The apparatus for calculating vehicle-wheel revolution values can be applied when vehicle-wheel speeds are calculated from vehicle-wheel rotation angles, or when accelerations are calculated or estimated for a traction control.

Disclosed herein is a preferred embodiment of the present invention. This embodiment is only an illustration of the present invention, which invention is limited solely by the scope of the appended claims.

What is claimed is:

1. An apparatus for calculating vehicle-wheel revolution estimated values and performing vehicular control based thereon, the apparatus comprising:
    at least one vehicle-wheel sensor for detecting a parameter from movement of vehicle wheels and producing an electric signal corresponding to said parameter; and
    an electronic control unit operatively connected to said at least one vehicle wheel sensor, comprising:
    means for calculating another parameter from the detected parameter; and
    means for removing noise from one of the detected parameter and the calculated parameter to obtain said estimated value;
    output means for outputting an electric signal corresponding to said estimated value; and
    control means for receiving said electric signal from the output means and performing vehicular control based thereon,
    said means for removing noise comprising:
    difference detection means for detecting a difference between one of the detected parameter and the calculated parameter, and a previous estimated value;
    difference accumulating means for accumulating the difference detected by the difference detection means at a predetermined rate;
    various determining means for determining a variation value and reducing an increase rate of the variation value when an absolute value of the difference accumulated by the difference accumulating means increases; and
    estimated-value updating means for updating the estimated value according to the variation value.

2. An apparatus for calculating vehicle-wheel revolution estimated values and performing vehicular control based thereon according to claim 1, wherein the detected parameter represents a vehicle-wheel revolution.

3. An apparatus for calculating vehicle-wheel revolution estimated values and performing vehicular control based thereon according to claim 1, wherein the calculated parameter represents a vehicle-wheel speed.

4. An apparatus for calculating vehicle-wheel revolution estimated values and performing vehicular control based thereon according to claim 1, wherein the difference accumulating means calculate the accumulated value of the difference according to the formula:

$$B_n = K_1 \cdot (B_{n-1} - C_{n-1}) + (A_n - D_{n-1})$$

where Bn is an accumulated value of the difference, K1 is a constant and may change, $B_{n-1}$, is the previous difference, $C_{n-1}$ is the previous variation, $A_n$ is one of the detected parameter and the calculated parameter, and $D_{n-1}$ is the previous estimated value.

5. An apparatus for calculating vehicle-wheel revolution estimated values and performing vehicular control based thereon according to claim 1, wherein the variation determining means includes a means for determining the variation by multiplying the accumulated value of the difference by coefficients and a means for decreasing the coefficients when the absolute value of the accumulated value of the difference exceeds a predetermined value.

6. An apparatus for calculated vehicle-wheel revolution estimated values and performing vehicular control based thereon according to claim 1, wherein the variation determining means include means for determining the present variation ($C_n$) according to the formula:

$$C_n = f(X_n)$$

$$X_n = K_2 \cdot B_n (\Delta B_n \cdot B_n \geq 0)$$

$$X_n = 0 \ (\Delta B_n \cdot B_n < 0)$$

where $\Delta B_n$ is the difference and is determined according to the formula: $\Delta B_n = B_n - B_{n-1}$, and a constant $K_2$ may change.

7. An apparatus for calculating vehicle-wheel revolution estimated values and performing vehicular control based thereon according to claim 6, wherein the variation determining means includes a means for determining the present variation according to the formula:

$$
\begin{array}{lll}
C_n & = K5' & (K5 \leq X_n) \\
C_N & = K3 + K4 \cdot (X_n - K3) & (K3 \leq X_n < K5) \\
C_n & = X_n & (-K3 \leq X_n < K3) \\
C_n & = -K3 - K4 \cdot (X_n + K3) & (-K5 \leq X_n < -K3) \\
C_n & = -K5' & (X_n < -K5)
\end{array}
$$

wherein K3, K4, K5 are constants and may change, $\pm K'$ are determined according to the formula: $\pm K5' = \pm K3 + K4 \cdot (K5 - K3)$.

8. An apparatus for calculating vehicle-wheel revolution estimated values and performing vehicular control based thereon according to claim 1, wherein the variation determining means include a table that reduces an increase rate of the variation when the absolute value of the difference accumulated by the difference accumulating means increases.

9. An apparatus for calculating vehicle-wheel revolution estimated values and performing vehicular control based thereon according to claim 1, wherein the estimated-value updating means update the present estimated value according to the formula:

$$D_n = D_{n-1} + C_n$$

10. An apparatus for calculating vehicle-wheel revolution estimated values and performing vehicular control based thereon according to claim 1, wherein the estimatedvalue updating means have a table that determines the present estimated value in relation to the previous estimated value and the present variation.

11. An apparatus for calculating vehicle-wheel revolution estimated values and performing vehicular control based thereon according to claim 1, wherein the control means is an antiskid control means of the vehicle.

12. An apparatus for calculating vehicle-wheel revolution estimated values and performing vehicular control based thereon according to claim 1, wherein the detected parameter represents a vehicle wheel speed.

13. An apparatus for calculating vehicle-wheel revolution estimated values and performing vehicular control based thereon according to claim 1, wherein the calculated parameter represents a vehicle-wheel acceleration.

* * * * *